United States Patent [19]

Kou

[11] Patent Number: 5,429,546
[45] Date of Patent: Jul. 4, 1995

[54] PROCESSING WHOLE CRAYFISH TO SIMULATE FINGER LOBSTER SERVING

[75] Inventor: Ming B. Kou, Rolling Hills Estates, Calif.

[73] Assignee: Red Chamber Co., Vernon, Calif.

[21] Appl. No.: 315,093

[22] Filed: Sep. 29, 1994

[51] Int. Cl.⁶ .............................................. A22C 29/02
[52] U.S. Cl. ............................................. 452/1; 452/4; 452/5
[58] Field of Search .................................. 452/1, 4, 5

[56] References Cited

U.S. PATENT DOCUMENTS 4,385,422  5/1983  Ingalls et al. ............................ 452/1
4,928,352  5/1990  Thibodeaux ............................. 452/1
5,055,085  10/1991  Thibodeaux ............................. 452/1

Primary Examiner—Willis Little
Attorney, Agent, or Firm—Natan Epstein

[57] ABSTRACT

Whole crayfish is processed to derive a food serving resembling in appearance a small lobster by deheading the crayfish, making a U-shaped incision around the belly shell encompassing the anal opening of the crayfish, and peeling away the belly shell including the anal opening and the digestive tract still attached to the anal opening, thereby to devein the crayfish and expose the edible flesh contained in the hard shell in a single operation. When subsequently heated during cooking, the flesh tends to curl slightly away from the hard shell for easier extraction.

13 Claims, 1 Drawing Sheet

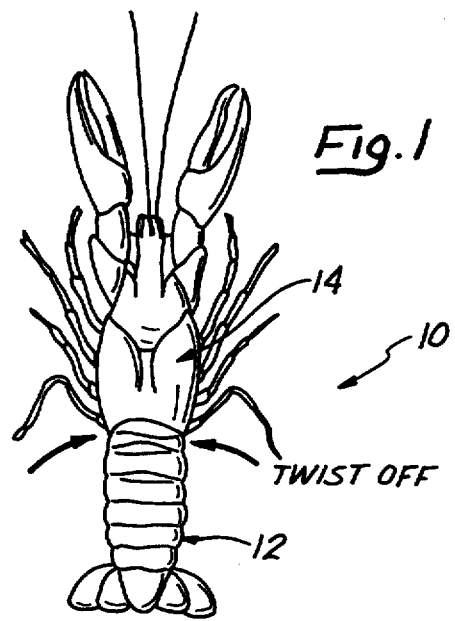
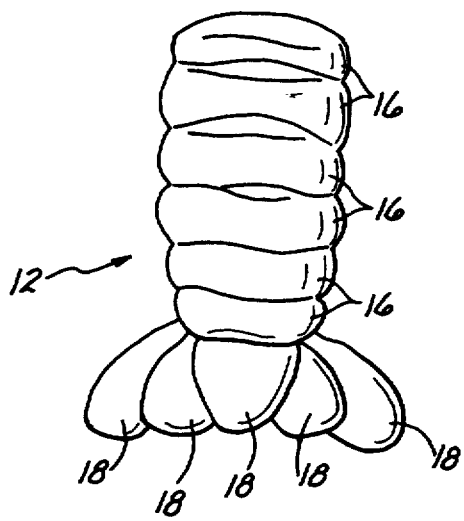
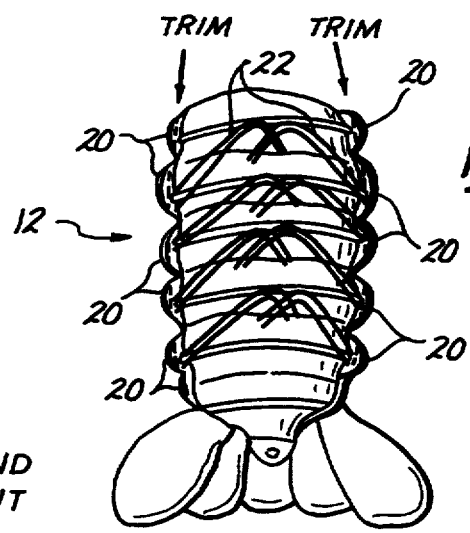
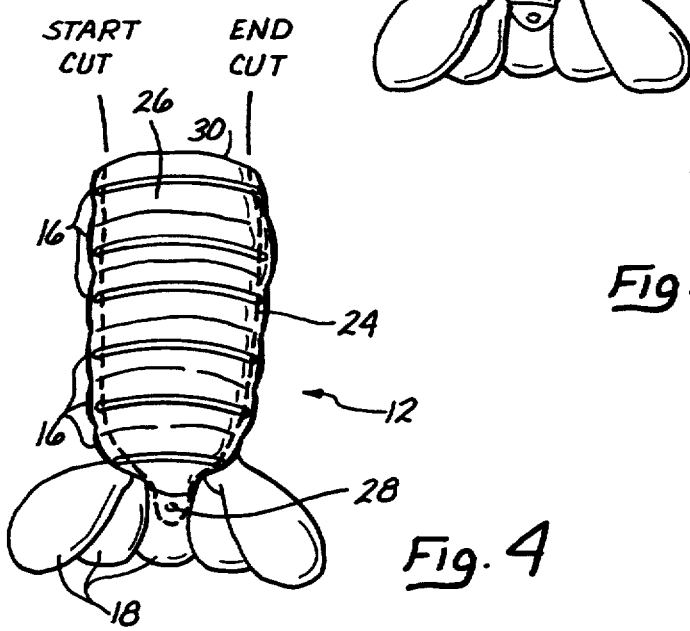
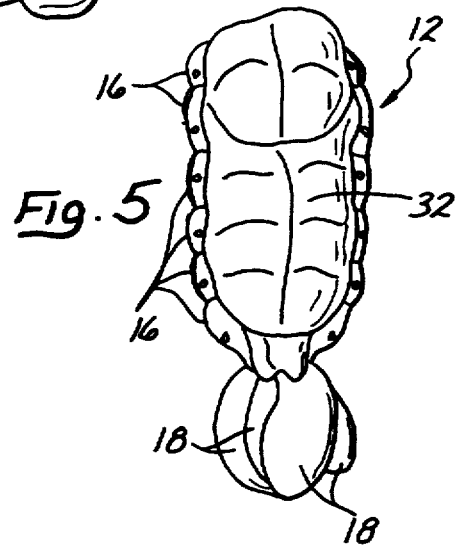

5,429,546

PROCESSING WHOLE CRAYFISH TO SIMULATE FINGER LOBSTER SERVING

BACKGROUND OF THE INVENTION

1. Field of the Invention

This invention pertains generally to the field of seafood processing and preparation and more specifically concerns a method for processing crayfish in order to derive a food item which resembles in appearance a serving of finger lobster.

2. State of the Prior Art

Seafood continues to enjoy a world wide rise in popularity as its health benefits continue to become apparent and are widely disseminated. The resulting demand has put considerable pressure on traditional sources of seafood of all types, and has driven up prices for these products.

A need exists for sources of seafood which are appetizing and convenient to the consumer and available at reasonable cost.

Among the many varieties of seafood, crayfish, also known as crawfish and langostino, is a relatively underutilized seafood resource, even though it is found in many areas around the globe and is relatively easy to cultivate. In part this is because of the unfamiliar appearance of the crayfish to many Western consumers and is also due to the relative difficulty of extracting the edible meat of the crayfish from its shell. In the past, eating crayfish typically involved the cooking of the entire crayfish, which was then served whole. It was left to the consumer to dehead the crayfish and then extract the edible meat by cracking the shell and sucking out the meat. Generally, consumption of crayfish has been a rather messy and inconvenient undertaking.

What is needed is a method for processing crayfish so as to derive a food serving which is more readily acceptable in appearance and presentation to the consumer and which is conducive to easy and convenient consumption of the edible portions of the crayfish.

SUMMARY OF THE INVENTION

This invention addresses the aforementioned need by providing a method for processing crayfish to derive a food serving which resembles in appearance a serving of so-called finger lobster, which is a rather popular and prized type of seafood.

The method of this invention is carried out by providing a whole crayfish, deheading the crayfish, and making a U-shaped incision around the belly shell, the incision also encompassing the anal opening of the crayfish. The belly shell of the crayfish is then separated from the crayfish body, including the digestive tract still attached to the anal opening thereby simultaneously deveining the crayfish and exposing the edible flesh contained in the remaining hard shell.

Deheading may be done by manually twisting off the head portion of the crayfish, preferably by pivoting the head in a downward direction in relation to the body of the crayfish so as to preserve neck meat attached to the body. Any yellow roe exposed by removal of the head portion is usually removed.

The sharp edges of the hard shell of the crayfish may be trimmed away, for example prior to making the U-shaped incision, and ventral appendages still attached to the crayfish body may be detached and discarded.

The belly shell is best removed by peeling it back from the head end towards the tail end of the deheaded crayfish body, jiggling the belly shell at the anal opening to loosen the digestive tract from the surrounding edible flesh, and then removing the belly shell to pull out the digestive tract still attached to the belly shell.

The whole crayfish fish will typically be live crayfish, which should be washed at least once and preferably in three changes of water followed by chilling the live crayfish prior to deheading. The crayfish should be washed in a dilute chlorine solution followed by rinsing with water at least following deheading and prior to trimming of the hard shell. The crayfish should be kept chilled on ice or ice water from prior to said deheading through the remainder of the process in order to prevent bacterial growth.

The processed crayfish body is normally prepared for consumption by heating it to a condition suitable for eating, which causes the edible flesh to curl slightly away from the hard shell for easy extraction.

BRIEF DESCRIPTION OF THE DRAWINGS

FIG. 1 is a top plan or dorsal view of a typical crayfish specimen suitable for processing according to the method of this invention;

FIG. 2 is a dorsal view of the crayfish tail of FIG. 1 following deheading of the specimen;

FIG. 3 is a ventral or underside view of the crayfish tail of FIG. 2, indicating trim lines for removing the sharp lower edges of the hard dorsal shell;

FIG. 4 is a ventral view of the crayfish tail of FIG. 3 shown with the hard shell and ventral appendages trimmed away, with heavy dotted lining indicating the U-shaped encompassing the soft belly shell and anal opening;

FIG. 5 is a ventral view as in FIG. 4, showing the edible flesh exposed by removal of the soft belly shell with the digestive tract attached to the anal opening.

DETAILED DESCRIPTION OF THE PREFERRED EMBODIMENT

FIG. 1 shows a typical crayfish specimen generally designated by numeral 10, which has a tail portion 12 and a head portion 14.

The whole crayfish 10 will normally be obtained live from commercial suppliers. Crayfish are an especially hardy species and may survive for two or more days out of their normal water habitat. The live crayfish 10 are first washed in cold water and rinsed three times, and then chilled by immersion in ice water to slow their metabolic rates and minimize their movements, in order to facilitate their handling.

The crayfish 10 is then deheaded by manually twisting the head portion 14 off of the tail portion 12 at the location indicated by the two arrows in FIG. 1, and the head portion 14 is discarded. The head portion is generally considered unfit for human consumption, although it can be processed for use as animal feed. Any yellow roe found in the neck area exposed by removal of the head is also removed and discarded. The crayfish is then washed in an iced dilute chlorine water solution of at least 10 ppm (parts per million) of chlorine for bacterial decontamination, followed by twice rinsing with chilled water.

The crayfish tail 12, better seen in FIG. 2, has a top or dorsal side which is covered by an articulated hard shell made up of several shell segments 16 which generally tapers towards a tail end, and several tail fins 18 attached at the tail end in a fan-like arrangement. The tail fins 18 are shown in deployed condition in FIGS. 1–4, but can be closed or folded together such that the five tail fins 18 generally overlap one another, as in FIG. 5.

Turning now to FIG. 3, it is seen that each hard shell segment 16 terminates on the ventral side of the tail portion 12 in relatively sharp edges 20. These sharp edges 20 are trimmed away to avoid possible scraping of the fingers during subsequent handling, both for processing and consumption purposes. The trimming may be done manually with a pair of sharp scissors, cutting along the trim lines indicated in dotted lining along each side of the tail 12 in FIG. 3. During this step, the eight pairs of ventral appendages 22 may also be removed.

Turning now to FIG. 4, a generally U-shaped incision 24 is made along the heavy dotted line with a sharp small-bladed knife, such as a surgical scalpel or similar instrument, in the relatively soft belly shell 26 of the crayfish tail portion 12. It is important to note that the incision 24 encompasses the anal opening 28 of the crayfish, at the tail end of the belly shell 26. While the incision 24 can be made as a single continuous incision by a skilled worker, the same end result can be achieved by one of lesser skill by making two or more incisions along the heavy dotted line in FIG. 4, so as to divide the belly shell 26 from the hard shell segments 16 along the heavy dotted line. Inclusion of the anal opening 28 with the belly shell 26 is important to the method of this invention in that it permits deveining of the crayfish tail portion 12 in one operation combined with removal of the belly shell 26. Deveining means the removal of the digestive tract or intestine which extends internally through the crayfish body from the anal opening 28 towards the head end 30. The digestive tract has the general appearance of a dark, somewhat thick thread, and normally contains fecal matter.

The belly shell 26 is removed from the tail portion 12 by peeling it up and away from the crayfish body, starting at the head end 30 and pulling towards the tail. When nearly all of the belly shell 26 has separated from the body portion 12 and the belly shell only remains attached around the anal opening 28, the belly shell is jiggled in a series of short light, careful pulls away from the body portion 12 so as to pull on the vein which is attached to the anal opening 28 on the interior side of the belly shell 26, in order to loosen and detach the vein from its surrounding tissues. The vein is then drawn out as a single continuous piece by pulling the belly shell 26 away from the tail portion 12, at the same time exposing the light colored, edible flesh 32 contained in the hard shell segments 16. The belly shell with the attached vein is then discarded.

The tail fins 18 in FIG. 5 are preferably folded together prior to packaging and commercial distribution of the crayfish body 12 in order to reduce the likelihood of the fins being broken during shipping and subsequent handling. The portion 12 is then ready for freezing prior to transport and distribution to retail food vendors. Portions 12 are placed on a suitable tray and washed again in dilute chlorine solution as before, followed by twice rinsing with chilled water. The tail portions are then 12 soaked for 10 to 15 minutes in a water solution of tripolyphosphate at no more than 1% concentration. The tripolyphostate solution helps with moisture and color retention. For soaking a 100 lb batch of crayfish tails, the solution may be prepared by dissolving 1 lb of tripolyphosphate in 100 lbs of water, then adding 25 lbs of ice to the solution. The solution is discarded after one use.

The tail portions 12 are then frozen for between 2.5 and 3 hours at a temperature of between minus 38 degrees and minus 42 degrees Celsius, to achieve an internal body temperature of 0 degree Celsius. A 5% single glaze is then applied by washing with clear water and individually quick freezing (IQF) at between minus 38 and minus 42 degrees Celsius. The single glaze helps protect the integrity of the individual crayfish tails during packaging and transport. The glazed tails are then bagged in plastic, and are ready for commercial distribution.

The portion 12 is prepared for eating by heating, typically sauteing in the shell on a fry pan, although other cooking methods may be equally suitable depending on the personal taste of the consumer. Heating of the portion 12 causes the meat 32 to curl up and away from the hard shell segments 16, making the meat 32 easy to extract from the shell either with fingers or with the aid of a suitable eating utensil, such as a fork.

The portion 12 in its final condition illustrated in FIG. 5 makes an appealing and presentable food item which resembles a serving of finger lobster. The latter is a recognized and prized food item, leading the consumer to associate presently underutilized crayfish with a known and desirable food item. The previously mentioned hurdles standing in the way of more widespread consumption of crayfish, namely the unfamiliarity of this seafood to the consuming public and the inconvenience of its consumption are thus overcome in the crayfish serving 12, prepared according to the method of this invention.

While a certain preferred embodiment of the invention has been described and illustrated for purposes of clarity and example, it must be understood that many changes, substitutions, and modifications to the described embodiment will become obvious to those possessed of ordinary skill in the art without thereby departing from the scope and spirit of the present invention, which is defined by the following claims.

What is claimed is:

1. A method for processing crayfish to derive a food serving resembling in appearance a small lobster, comprising the steps of:
   providing a whole crayfish;
   deheading said crayfish:
   making a U-shaped incision around the belly shell, said incision encompassing the anal opening of said crayfish; and
   separating the belly shell including the anal opening together with the digestive tract attached to the anal opening and external appendages attached to the belly shell thereby to expose the edible flesh contained in the hard top shell.

2. The method of claim 1 further comprising the step of trimming away sharp edges of the hard shell of said crayfish:

3. The method of claim 1 wherein said step of deheading comprises the step of twisting off the head portion of the crayfish.

4. The method of claim 3 wherein said step of twisting off comprises the step of pivoting the head in a downward direction in relation to the body of the crayfish so as to preserve neck meat attached to the body.

5. The method of claim 1 further comprising the step of removing yellow roe exposed by removal of the head portion.

6. The method of claim 1 wherein said separating step comprises peeling the belly shell back from the head end towards the tail end of the deheaded crayfish body, jiggling the belly shell at the anal opening to loosen the digestive tract from the edible means, and removing the belly shell with the digestive tract still attached thereto.

7. The method of claim 1 further comprising the step of washing the crayfish body in a dilute chlorine solution and then rinsing the crayfish body with water.

8. The method of claim 1 wherein said step of providing a whole crayfish comprises providing a live crayfish, washing the live crayfish, and chilling the live crayfish prior to said deheading step.

9. The method of claim 1 further comprising the step of washing the crayfish in dilute chlorine solution after said deheading step followed by rinsing in water prior to said trimming step.

10. The method of claim 1 further comprising the step of keeping said crayfish chilled on ice or ice water from prior to said deheading through the remaining steps of said method.

11. The method of claim 1 further comprising the step of heating the remaining crayfish body to a condition suitable for eating, thereby causing the edible flesh to curl slightly away from the hard shell for easier extraction.

12. A method for processing crayfish to derive a food serving resembling in appearance a small lobster, comprising the steps of:
   providing a whole crayfish;
   deheading said crayfish:
   trimming away sharp edges of the hard shell around the soft belly shell of said crayfish;
   making a U-shaped incision around the belly shell, said incision encompassing the anal opening of said crayfish; and
   peeling the belly shell back from the head end towards the tail end of the deheaded crayfish body, jiggling the belly shell at the anal opening to loosen the digestive tract from the edible means, and removing the belly shell with the digestive tract still attached thereto.

13. The method of claim 12 further comprising the step of heating the deheaded crayfish body to a condition suitable for eating, thereby causing the edible flesh to curl slightly away from the hard shell for easier extraction.

* * * * *